United States Patent
Agulnik et al.

(10) Patent No.: US 9,231,776 B2
(45) Date of Patent: Jan. 5, 2016

(54) SYSTEM AND METHOD FOR MBMS SUPPORT

(71) Applicant: MOTOROLA SOLUTIONS, INC., Schaumburg, IL (US)

(72) Inventors: Anatoly Agulnik, Deerfield, IL (US); Peter M. Drozt, Prairie Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 382 days.

(21) Appl. No.: 13/670,685

(22) Filed: Nov. 7, 2012

(65) Prior Publication Data

US 2014/0126452 A1    May 8, 2014

(51) Int. Cl.
| | |
|---|---|
| *H04W 4/10* | (2009.01) |
| *H04W 4/06* | (2009.01) |
| *H04L 12/18* | (2006.01) |
| *H04L 29/06* | (2006.01) |
| *H04W 4/02* | (2009.01) |
| *H04W 76/00* | (2009.01) |

(52) U.S. Cl.
CPC .......... *H04L 12/189* (2013.01); *H04L 65/1093* (2013.01); *H04L 65/4061* (2013.01); *H04L 65/4076* (2013.01); *H04W 4/06* (2013.01); *H04W 4/10* (2013.01); *H04W 4/021* (2013.01); *H04W 76/005* (2013.01)

(58) Field of Classification Search
None
See application file for complete search history.

(56) References Cited

U.S. PATENT DOCUMENTS

| | | | | |
|---|---|---|---|---|
| 5,778,320 | A * | 7/1998 | Drozt et al. | 455/509 |
| 8,195,166 | B1 * | 6/2012 | Oprescu-Surcobe et al. | 455/436 |
| 8,462,669 | B2 | 6/2013 | Huh | |
| 2004/0053619 | A1 * | 3/2004 | Kim et al. | 455/445 |
| 2004/0185890 | A1 * | 9/2004 | Drozt et al. | 455/519 |
| 2006/0072517 | A1 | 4/2006 | Barrow et al. | |
| 2007/0054687 | A1 * | 3/2007 | Akita et al. | 455/518 |
| 2008/0298294 | A1 * | 12/2008 | Gonsa et al. | 370/312 |
| 2010/0157869 | A1 * | 6/2010 | Song | 370/312 |
| 2011/0047558 | A1 * | 2/2011 | Agulnik et al. | 719/318 |
| 2011/0263288 | A1 * | 10/2011 | Korus et al. | 455/518 |
| 2012/0170501 | A1 * | 7/2012 | Drozt et al. | 370/312 |
| 2012/0170502 | A1 | 7/2012 | Korus et al. | |
| 2012/0172028 | A1 | 7/2012 | Korus et al. | |
| 2012/0182921 | A1 * | 7/2012 | Tsuboi et al. | 370/312 |

(Continued)

OTHER PUBLICATIONS

Corresponding International Application, PCT/US2013/066539—International Search Report with Written Opinion mailed Apr. 7, 2014.

*Primary Examiner* — Timothy J Weidner
*Assistant Examiner* — Jana Blust
(74) *Attorney, Agent, or Firm* — Steven A. May

(57) ABSTRACT

A system and method handles a group session of a communication group. The method includes determining server association data and access network association data for each mobile unit in a communication group. The server association data indicates a first association with a Push-To-Talk (PTT) server. The access network association data indicates a second association with an operating area respective to the PTT servers. The method includes determining a first MU of the MUs in the communication group being associated with a first PTT server and associated with a MBMS operating area of a second PTT server, the first PTT server controlling the group session. When none of the MUs participating in the group session is associated with the second PTT server, the method includes inviting the second PTT server to join the group session of the communication group.

21 Claims, 3 Drawing Sheets

(56) References Cited

U.S. PATENT DOCUMENTS

| | | | |
|---|---|---|---|
| 2012/0202493 A1* | 8/2012 | Wang et al. ................ 455/435.1 |
| 2013/0064160 A1 | 3/2013 | Newberg et al. |
| 2013/0121226 A1 | 5/2013 | Anchan et al. |
| 2013/0136049 A1 | 5/2013 | Song et al. |
| 2014/0120973 A1 | 5/2014 | Agulnik et al. |

* cited by examiner

SYSTEM AND METHOD FOR MBMS SUPPORT

FIELD OF THE DISCLOSURE

The invention relates to providing Multimedia Broadcast Multicast Services (MBMS) support. Specifically, a controlling push-to-talk (PTT) server invites an unaware PTT server having no devices associated therewith in a group session of a PTT communication group to provide MBMS support to devices that are participants of the group session and that are operating within a Multicast Broadcast Single Frequency Network (MBSFN) area that is part of an operating area of the unaware PTT server.

BACKGROUND

A Push-To-Talk (PTT) server may be used to provide voice features. A traditional system that provides the PTT functionality may be performed over a communication network such as a Long Term Evolution (LTE) network. In such a system, only a single, controlling PTT server controls a particular group session of a PTT communication group that includes a plurality of mobile units (MUs). The controlling PTT server is configured to involve the MUs that belong to the controlling PTT server as well as MUs that belong to other (i.e., participating) PTT servers. The MUs that belong to, and operate in a coverage area of, the controlling PTT server may directly connect to the controlling PTT server for control messaging and media that is sent by unicast. The MUs that belong to, and operate in coverage areas of, other (participating) PTT servers may indirectly receive the control messaging and media, which is sent by unicast through the other PTT servers and which other PTT servers are connected to the controlling PTT server via a network-to-network interface (NM).

Similarly, for media broadcasts, the MUs that belong to the controlling PTT server and that operate in a Multicast Broadcast Single Frequency Network (MBSFN) area of an operating area of the controlling PTT server may again directly connect to the controlling PTT server for receipt of the media broadcasts. Specifically, the Multimedia Broadcast Multicast Services (MBMS) operating area may define at least one MBSFN area which provides a respective communication channel that may be configured for the group session of the PTT communication group. And the MUs that belong to other (participating) PTT servers and that are disposed within an operating area (or MBSFN area of that operating area) of the other PTT servers indirectly receive the media broadcasts from the controlling PTT server through the other PTT servers.

When MBMS support is required for the MUs that belong to the controlling PTT server but operate in an MBSFN area of one of the other PTT servers, the other PTT server serving the MBSFN area is required to provide MBMS support for these MUs. However, for the other PTT server to provide the MBMS support for these MUs, at least one MU included in the group session of the PTT communication group must belong to the other PTT server. That is, if at least one MU that is part of the group session belongs to the other PTT server, then an MU that belongs to the controlling PTT server but that operate in the MBSFN area of the other PTT server is capable of being provided the MBMS support by the other PTT server. However, if no MU that is part of the group session belongs to the other PTT server, then an MU that belongs to the controlling PTT server that operate in a MBSFN area the other PTT server might not be provided MBMS support, as the other PTT server is not associated with the group session. That is, the other PTT server, having no MUs that belong to the group session, is unaware of the group session as well as any MU belonging to the controlling PTT server that may operate in an MBSFN in its operating area.

Accordingly, there is a need for providing MBMS support for MUs that are participants of a group session of a PTT communication group belonging to the controlling PTT server but that are operating in a MBSFN area of an operating area of an unaware, other PTT server.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
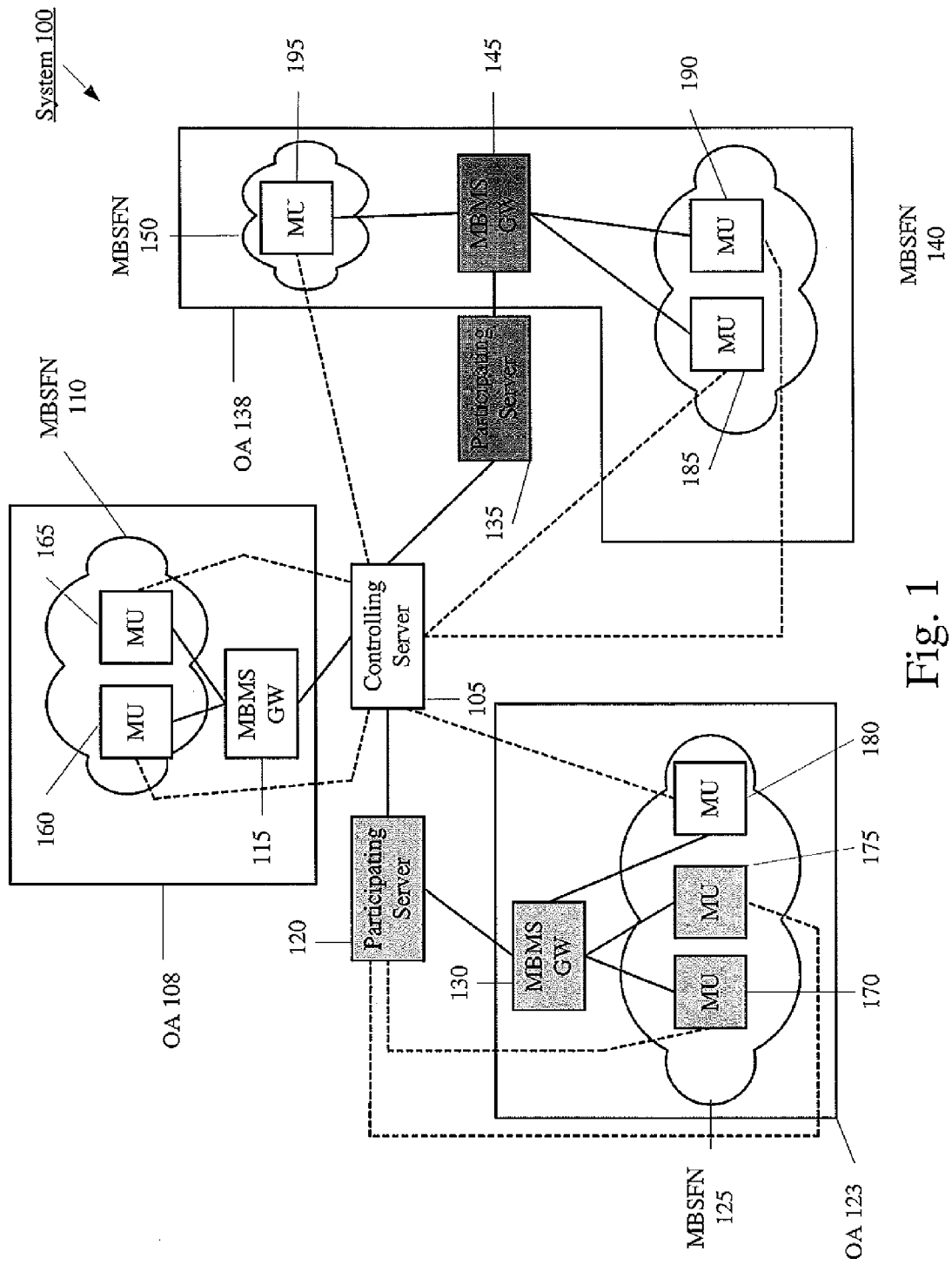
FIG. 1 illustrates a system for providing multimedia broadcast multicast services (MBMS) support in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a system and method for providing multimedia broadcast multicast services (MBMS) support. The method relates to handling a group session of a communication group. The method comprises determining server association data for a plurality of mobile computing units (MUs) in the communication group, wherein the server association data is indicative of a Push-To-Talk (PTT) server of a plurality of PTT servers to which each mobile computing unit (MU) of the plurality of MUs belongs; determining access network association data for the plurality of MUs, wherein the access network association data is indicative of an operating area respective to a PTT server of the plurality of PTT servers in which each MU of the plurality of MUs operates; determining, as a function of the server association data, a first MU of the plurality of MUs that belongs to a first PTT server of the plurality of PTT servers and, as a function of the access network association data, that operates in an operating area of a second PTT server of the plurality of PTT servers, wherein the first PTT server is a controlling PTT server for the group session; and determining, based on the server association data, that none of the plurality of MUs belongs to the second PTT server and, in response, transmitting invitation data from the first PTT server to the second PTT server to invite the second PTT server to join the group session of the communication group.

The exemplary embodiments may be further understood with reference to the following description and the appended drawings, wherein like elements are referred to with the same reference numerals. The exemplary embodiments describe a system and method for providing MBMS support to MUs of a PTT communication group participating in a group session. Specifically, a controlling PTT server of the group session is in communication with a first PTT server and a second PTT server so that MUs belonging to, and residing in an operating area of (and having at least one Multicast Broadcast Single Frequency Network (MBSFN)), the first PTT server are included in the group session as well as MUs not belonging to, but residing in an operating area of (and having at least one MBSFN), a second PTT server. The MBMS, the MUs, the PTT communication group, the group session, the controlling PTT server, the first and second PTT servers, and a related method will be discussed in further detail below.

The MBMS may relate to any point-to-multipoint interface specification configured to provide efficient delivery of broadcast and multicast services. For broadcast transmissions across multiple cells, MBMS may relate to a transmission via single frequency network configurations. Accordingly, MBMS functionalities may include mobile television and radio broadcasting as well as file delivery and emergency alerts as is used in broadcasts. Accordingly, the operating area of a PTT server may include at least one MBSFN area, that is, a geographical area that supports, that is, can be provided, MBSFN and which provides a respective communication channel that may be configured for (MBMS) broadcast of the group session of a PTT communication group. The MBSFN area may be a portion of the operating area of the PTT server in which the PTT server is capable of providing the multicast services and broadcasts in the communication channel.

It should be noted that the exemplary embodiments of the present invention relate to providing MBMS support when an MU operates in an MBSFN area of an operating area of a PTT server but the MU does not belong to the PTT server nor do any MUs that belong to the PTT server also belong to the group session of the PTT communication group. Accordingly, several assumptions may be made. In a first assumption, each MU and the PTT server are assumed to be configured with and support the MBMS features. However, it should be noted that not all of the MUs and/or the PTT servers may be configured to support MBMS. In a second assumption, the controlling PTT server of the group session of the PTT communication group is assumed to not have a direct access to MBSFN areas in all or at least some regions. That is, in a first example, a MU may operate in an area not supported by the controlling PTT server (e.g., outside the MBSFN area or the operating area of the controlling PTT server). In a second example, a MU may operate in the operating area of the PTT server but not within a MBSFN area thereof. In a third example, the MU may be outside the MBMS operating area of the controlling PTT server but operate in a MBSFN area of an operating area of another PTT server. In a fourth example, the MU may potentially operate in an area not supported by any PTT server. In a third assumption, the exemplary embodiments of the present invention assume that at least one MU of the group session of the PTT communication group operate in an MBSFN area of an operating area of the another PTT server but does not belong to the another PTT server.

FIG. 1 depicts a system 100 for providing MBMS support in accordance with some exemplary embodiments of the present invention. As illustrated, the system 100 may be for a controlling PTT server 105 having an operating area 108. The system 100 may relate to a PTT communication group providing PTT voice over a LTE network. However, it should be noted that the system 100 may relate to any PTT server providing MBMS support. The controlling PTT server 105 controls a group session of the PTT communication group among a plurality of mobile computing units (MUs) 160, 165, 170, 175, 180, 185, 190, and 195 (eight shown). As illustrated, the MUs may be disposed within an operating area of a contiguous LTE network, separate/independent LTE networks, or a combination thereof. The system 100 also relates to a plurality of participating PTT servers 120, 135, in which the participating PTT server 120 provides service to an operating area 123 and the participating PTT server 135 provides service to an operating area 138. The operating areas 108, 123, 138 may all be part of the LTE network. As illustrated, the MUs 160, 165 may be disposed within the operating area 108; the MUs 170, 175, 180 may be disposed within the operating area 123; and the MUs 185, 190, 195 may be disposed within the operating area 138.

It should be noted that the use of a single operating area for each of the controlling PTT server 105 and the participating PTT servers 120, 135 is only exemplary. Those skilled in the art will understand that a PTT server may include a variety of different operating areas being controlled thereby. Thus, each PTT server may include a further MBMS operating area being controlled thereby. Accordingly, the exemplary embodiments of the present invention may further relate to the PTT servers having more than one operating area.

An MBMS Gateway (GW) may be configured to provide MBMS support to the MUs that are operating in the operating areas of the PTT servers associated with the GW. Specifically, media broadcasts during the group session of the PTT communication group may be transmitted to the MUs via a corresponding MBMS GW. For example, as illustrated in FIG. 1, the operating area 108 may be associated with an MBMS GW 115; the operating area 123 may be associated with an MBMS GW 130; and the operating area 138 may be associated with an MBMS GW 145. However, as will be understood by those skilled in the art, further network nodes or elements beyond the MBMS GW may be included for the broadcasts to be transmitted and received. As will be described in further detail below, the MUs 160-195 may belong to a particular PTT server (e.g., be associated with a particular PTT). It should be noted that the MUs 160-195 may be any electronic device configured with a radio functionality such as a portable device including a mobile phone, a personal digital assistant, a smartphone, a tablet, a laptop, a barcode reader, etc. or a stationary device including a desktop computer. However, it should be noted that the MUs 160-195 may represent any type of device that is configured with the MBMS functionalities for the PTT communication group. For purposes of the description of the exemplary embodiments of the present invention below, the MUs 160-195 are all participating devices, that is, may all participate in a group session of the PTT communication group. However, it should be further be noted that additional MUs or devices may be disposed within the LTE that is not an affiliated device (e.g., does not participate) in the group session of the PTT communication group.

The controlling PTT server 105 is the PTT server that is configured to control the group session of the PTT communication group. Those skilled in the art will understand that for any particular group session of the PTT communication group, only a single PTT server controls the group session. The controlling PTT server 105 may be responsible for coordinating and determining a manner in which the group session is to be performed as well as the MUs involved in the group session. Specifically, the controlling PTT server 105 may determine if the MUs involved in the group session are to be delivered control signaling and media (either directly or indirectly) through unicast or to be delivered with broadcast via MBMS services. Accordingly, the controlling PTT server 105 may communicate with the PTT servers 120, 135 to include, in the group session of the PTT communication group, the MUs that are disposed within the respective operating areas 123, 138, that are part of the PTT communication group, and that are members of the group session. Thus, since the MUs 160, 165 are disposed within an MBSFN 110 of the operating area 108 of the controlling PTT server 105, traditional methods may be used to provide MBMS support to these MUs, such as using an MBMS bearer in the MBSFN area 110 that includes the MUs 160, 165.

The participating PTT servers 120, 135 may also be PTT servers but are not configured to control the group session of the PTT communication group. According to the exemplary embodiments of the present invention, the participating PTT servers 120, 135 may be configured to provide the MBMS support for the MUs that are participating in the group session of the PTT communication group and that operate in one of the MBSFN areas of the operating areas 123, 138. The controlling PTT server 105 and the participating PTT servers 120, 135 may include substantially the same functionalities. However, it is again noted that those skilled in the art will understand that only a single PTT server is responsible for controlling the group session of the PTT communication group. As such, the controlling PTT server 105 controls the group session of the PTT communication group while the participating PTT servers 120, 135 provide the MBMS support for the group session of the PTT communication group (if requested as discussed below). The participating PTT servers 120, 135 may include a communication link with the controlling PTT server 105. For example, a network-to-network interface (NNI) may be established between the PTT servers. Accordingly, the NNI may define an interface specifying signaling and management functions between the network including the controlling PTT server 105 and a respective network for each of the participating PTT servers 120, 135.

As discussed above, the operating areas 123, 138 of the participating PTT servers 120, 135, respectively, may be operating areas in which the MUs operating therein may connect thereto for certain functionalities. Furthermore, the operating areas 123, 138 may include at least one MBSFN area for MBMS support (e.g., operating area 123 includes MBSFN area 125, operating area 138 includes MBSFN area 140 and MBSFN area 150). As illustrated, the MUs 160, 165, 180, 185, 190, 195 belong to the controlling PTT server 105 while the MUs 170, 175 belong to the participating PTT server 120. Accordingly, to join the group session, the MUs 160, 165, 180, 185, 190, 195 may directly transmit an invite request (e.g., SIP INVITE) to the controlling PTT server 105, as these MUs belong to the controlling PTT server (indicated as dashed lines in FIG. 1). The MUs 170, 175, however, may directly transmit an invite request to the participating PTT server 120, as these MUs belong to PTT server 120 (indicated as dashed lines in FIG. 1). Consequently, the participating PTT server 120 then forwards, to the controlling PTT server 105 via the NNI, the invite requests received from the MUs 170, 175. In this manner, the participating PTT server 120 is aware of the group session of the PTT communication group. Furthermore, the controlling PTT server 105 may receive server association data from each of the MUs in the group session of the PTT communication group that indicates the PTT server to which each such MU belongs, or is associated with. It should be noted that the controlling PTT server 105 may also initiate the invitation to the group session of the PTT communication group in which the MUs 160, 165, 180, 185, 190, 195 transmit a response to the invitation. However, in either case, the participating PTT server 135 is unaware of the PTT communication group as no invite requests are sent via the participating PTT server 135.

Those skilled in the art will understand that there are a variety of ways for the MUs to become participating devices in the group session of the PTT communication group. In a first example, the participating devices may be predetermined and known by the controlling PTT server 105 that controls the group session. Thus, the known participating devices may transmit the invite request or the controlling PTT server 105 may transmit the invite request to these known participating devices. In a second example, the participating devices may be dynamically added by transmitting the invite request so that these devices may be included in the group session of the PTT communication group. However, for purposes of the exemplary embodiments of the present invention, the manner in which the participating devices are determined may be performed in any way. It should also be noted that the invitation requests to the group session of the PTT communication group may include additional data. For example, the MUs that transmit the invite request may include the server association data (or the participating PTT server may include this data when forwarding the invite request to the controlling PTT server) or the controlling PTT server 105 may determine the server association data (for example, by maintaining in a memory of the PTT server, or being operable to communicate with, a provisioning database that stores a static mapping of each MU and a PTT server to which it belongs). The MUs may further transmit, for example, in the invite request or other control signaling such as location updates, access network association data (e.g., location) that indicates the operating area, the MBSFN area, or both in which the MU operates. The access network association data may further be used to determine the PTT server that controls the respective operating area.

In a similar manner to the invite requests, control signaling and media by unicast may be transmitted to the MUs of the group session of the PTT communication group. As the MUs 160, 165, 180, 185, 190, 195 are associated with, that is, belong to, the controlling PTT server 105, control signaling and media by unicast may be directly transmitted from the controlling PTT server 105 to these MUs. Control messaging sent by unicast may also be indirectly transmitted to the MUs 170, 175, specifically via the participating PTT server 120 serving these MUs and the NNI between the controlling PTT server 105 and the participating PTT server 120.

In contrast to the control messaging by unicast, multicast services and broadcasts in MBMS functionalities require a local PTT server to provide the multicast broadcast functionalities when the MUs of the group session of the PTT communication group are operating outside the operating area 108 (specifically the MBSFN area 110) of the controlling PTT server 105 (i.e., the MUs are operating in a MBSFN area of an operating area that is not directly controlled by the controlling PTT server 105). Accordingly, the MUs operating outside the MBSFN area 110 in the operating area 108 of the controlling PTT server 105 may be incapable of receiving the broadcast data directly from the controlling PTT server 105. Thus, local PTT servers, such as the participating PTT servers 120, 135, are required to use MBMS services within MBSFN areas of their respective operating areas 123, 138 for the MBMS support of the MUs disposed therein. In this manner, employment of the MBMS GWs 130 and 145, and corresponding MBMS network elements, may be required to provide MBMS services to the MUs operating in an MBSFN area of the operating areas 123, 138. As discussed above, the MUs 160, 165 disposed in the operating area 108, having a direct connection to the controlling PTT server 105, may receive the multicast broadcast services using known methods within the MBSFN area 110. The MUs 170, 175 operating in the operating area 123, having a direct connection to the participating PTT server 120, may also receive the multicast broadcast services using known methods within the MBSFN area 125. Specifically, as the MUs 170, 175 transmitted the invite request to the controlling PTT server 105 via the participating PTT server 120, the participating server 120 is aware of the group session of the PTT communication group. Accordingly, the participating PTT server 120 may activate the MBMS support in the MBSFN area 125 where MUs 170, 175 operate. In a similar manner, the MU 180, belonging to controlling PTT server 105 but operating in the MBSFN area 125 having a direct connection to the participating server 120, may also receive the multicast broadcast services, since the MBMS services are activated in the MBSFN area 125 within the operating area 123. When the MU 180 transmits the invite request directly to the controlling PTT server 105, the controlling PTT server 105 may transmit data to the participating PTT server 120 indicating that the MU 180 is operating in the operating area 123. Thus, the participating PTT server 120 is further aware that MBMS support is to be provided for the MU 180.

In contrast to the participating PTT server 120, the group session of the PTT communication group does not include any MUs that belong to the participating PTT server 135. Accordingly, the participating PTT server 135 may be unaware of the group session of the PTT communication group. Specifically, no MUs transmit an invite request through the participating PTT server 135 for the group session. Therefore, the participating PTT server 135 is not alerted to whether the MBMS services are to be provided. Accordingly, in prior art systems, the MUs 185, 190, 195 may be incapable of being provided MBMS support to receive the multicast broadcasts. Traditional methods allow for only control messaging and media sent by unicast to these MUs as no local PTT server activates the MBMS services in its MBSFN area in its operating area in which these MUs are operating. Accordingly, the system 100 provides for an alerting of the PTT server 135 to the group session of the PTT communication group, for example, by transmitting invitation data to invite the PTT server 135 to join the PTT communication group (as will be discussed below). Thus, according to the exemplary embodiments of the present invention, the controlling PTT server 105 may be configured to invite the participating PTT server 135, thereby alerting the participating PTT server 135 of the group session of the PTT communication group as well as the MUs 185, 190, 195 that operate within the MBMS operating area 138, particularly within the MBSFN 140 or the MBSFN 150.

According to the exemplary embodiments of the present invention, the controlling PTT server 105 may initially determine the operating area in which the MUs 185, 190, 195 operate. Specifically, the controlling PTT server 105 may determine the MBSFN within the operating area where the MUs 185, 190, 195 are operating. As discussed above in the case where MUs transmit the invite request, since the MUs 185, 190, 195 belong to the controlling PTT server 105, these MUs transmit an invite request to the controlling PTT server 105 directly. The invite request may include access network association data, that is, an indication of the operating area, that is, operating area 138, and/or the MSBFN, that is, MBSFNs 140 and 150, where these MUs are operating. In a first example, the access network association data may be indicative of an identification of the MBSFN area where the MU is operating, from which the controlling PTT server 105 may extrapolate the corresponding MBMS operating area and the PTT server serving the MBSFN area. Accordingly, the controlling server PTT 105 may maintain in the memory of the PTT server, or have access to, MBMS operating area data, that is, a mapping among an MBMS operating area and corresponding MBSFN areas and PTT servers. In another example, the access network association data may include data regarding the operating area and the MBSFN area where the MU is operating, to directly indicate to the controlling PTT server 105 the participating PTT server controlling the indicated operating area. In this manner, the controlling PTT server 105 is aware of the MUs that are participating devices in the group session of the PTT communication group and is further aware of whether MBMS services may be provided thereto.

As a result, in the case of the MUs 160, 165, the controlling PTT server 105 may determine that the MBMS services are to be activated in its own operating area 108 in the MBSFN area 110. In the case of the MUs 170, 175, 180, the controlling PTT server 105 may determine that the MBMS services may be activated by the participating PTT server 120 for the MBMS services in one or more MBSFN areas of the operating area 123. Accordingly, the controlling PTT server 105 may transmit request data to the participating PTT server 120 to activate the MBMS services. As the participating PTT server 120 is aware of the group session of the PTT communication group (for example, via the invite requests transmitted by MUs 170 and 175 via the PTT server), the participating PTT server 120 may respond to the request data by transmitting, to controlling PTT server 105, response data indicating whether the MBMS services are capable of being provided. If affirmative (that is, MBMS services are capable of being provided), the response data may indicate that the MBMS services will be activated in the MBSFN area 125. The controlling PTT server 105 will then become aware that the broadcasts may be transmitted to MUs 170 and 175 (and MU 180 as well) via the participating PTT server 120. If negative (that is, MBMS services are not capable of being provided), the response data may indicate that the MBMS services will not be activated or cannot be activated in the MBSFN area 125 of the operating area 123. The controlling PTT server 105 will then become aware that the MUs 170, 175, and 180 may only receive control messaging by unicast (directly from the controlling server 105 for the MU 180 and indirectly for the MUs 170, 175 via the participating PTT server 120).

In the case of the MUs 185, 190, 195, the controlling PTT server 105 may determine that the participating PTT server 135, controlling the MBSFN areas 140 and 150 of the operating area 138, may be unaware of the group session of the PTT communication group, since no invite requests were received from, that is, transmitted via, the PTT server 135. According to the exemplary embodiments of the present invention, the controlling PTT server 105 may transmit an invite request to the participating PTT server 135 to initiate a process for the participating PTT server 135 to join the group session of the PTT communication group. When the participating PTT server 135 receives the invite request to the group session of the PTT communication group, the participating PTT server 135 is now aware of the group session of the PTT communication group. The controlling PTT server 105 may further transmit data regarding a number of MUs that are operating within each MBSFN area, that is, MBSFN areas 140 and 150, of the operating area 138 of the participating PTT server 135. As the participating PTT server 135 is aware of the group session of the PTT communication group and the respective number of MUs operating in each of the MBSFN areas 140, 150 of the operating area 138, the participating PTT server 135 may transmit response data to the controlling PTT server 105 indicating that MBMS services will or will not be activated in each of the MBSFN areas 140, 150 for the MUs 185, 190, 195. Once the participating PTT server 135 is included in the group session of the PTT communication group, the broadcasts of the PTT communication group may be transmitted by the participating PTT server 135 to the MUs 185, 190, 195, that is, to MUs 185 and 190 residing in the MBSFN area 140 and to MU 195 residing in the MBSFN area 150.

It should be noted that the transmission of an invite request from the controlling PTT server 105 to the participating server 135 may further include other determination steps as to whether the invite request should be transmitted at all. As discussed above, the controlling PTT server 105 may transmit data relating to the number of participating devices operating in the operating area 138 served by the participating PTT server 135. The controlling PTT server 105 may initially determine whether the MBMS services being activated for a respective MBSFN area within the operating area 138 by the participating server 135 should be performed. For example, it may be financially economical to only active MBMS services of an MBSFN area if two or more participating devices are operating therein. Therefore, if only a single participating device is operating in an MBSFN area, MBMS services may not be activated. In this way, the single participating device will receive only control messaging by unicast directly from the controlling PTT server 105. The participating PTT server 135 may also determine whether the MBMS services should be activated for each respective MBSFN area in which a participating device is operating. For example, the participating PTT server 135 may have a different threshold number in order for the MBMS services to be activated (e.g., at least four or more participating devices). In the exemplary embodiment illustrated in FIG. 1, the controlling PTT server 105 and/or the participating PTT server 135 may determine that MBMS services should be activated in the MBSFN area 140 for the two participating devices (i.e., MUs 185, 190) operating therein. However, the controlling PTT server 105 and/or the participating PTT server 135 may determine that MBMS services should not be activated in the MBSFN area 150 for the single participating device (i.e., MU 195) operating therein. In this way, the controlling PTT server 105 may transmit an invite request to the participating PTT server for MBMS services to be activated in only the MBSFN area 140. In such a scenario, the MU 195 may only receive control messaging by unicast directly from the controlling PTT server 105.

It should also be noted that when the group session of the PTT communication group has started, the controlling PTT server 105 may provide dynamic updates to the participating PTT servers 120, 135. Specifically, the updates may relate to the number of participating devices still remaining in the MBSFN area of the participating PTT servers 120, 135. Therefore, the participating devices may dynamically transmit access network association data (directly or indirectly as a function of which PTT server the device belongs to) to the controlling PTT server 105. When the controlling PTT server 105 determines that the number of participating devices operating in a particular MBSFN area has fallen under a predetermined threshold, the controlling PTT server 105 may transmit request data to indicate that MBMS services should be deactivated for that MBSFN area (unless relating to its own MBSFN area). Alternatively, when the controlling PTT server 105 determines that the number of participating devices operating in a particular MBSFN area has risen from under the predetermined threshold to over the predetermined threshold, the controlling PTT server 105 may transmit request data to indicate that MBMS services should be activated for that MBSFN area (again unless relating to its own MBSFN area).

Figure 2:
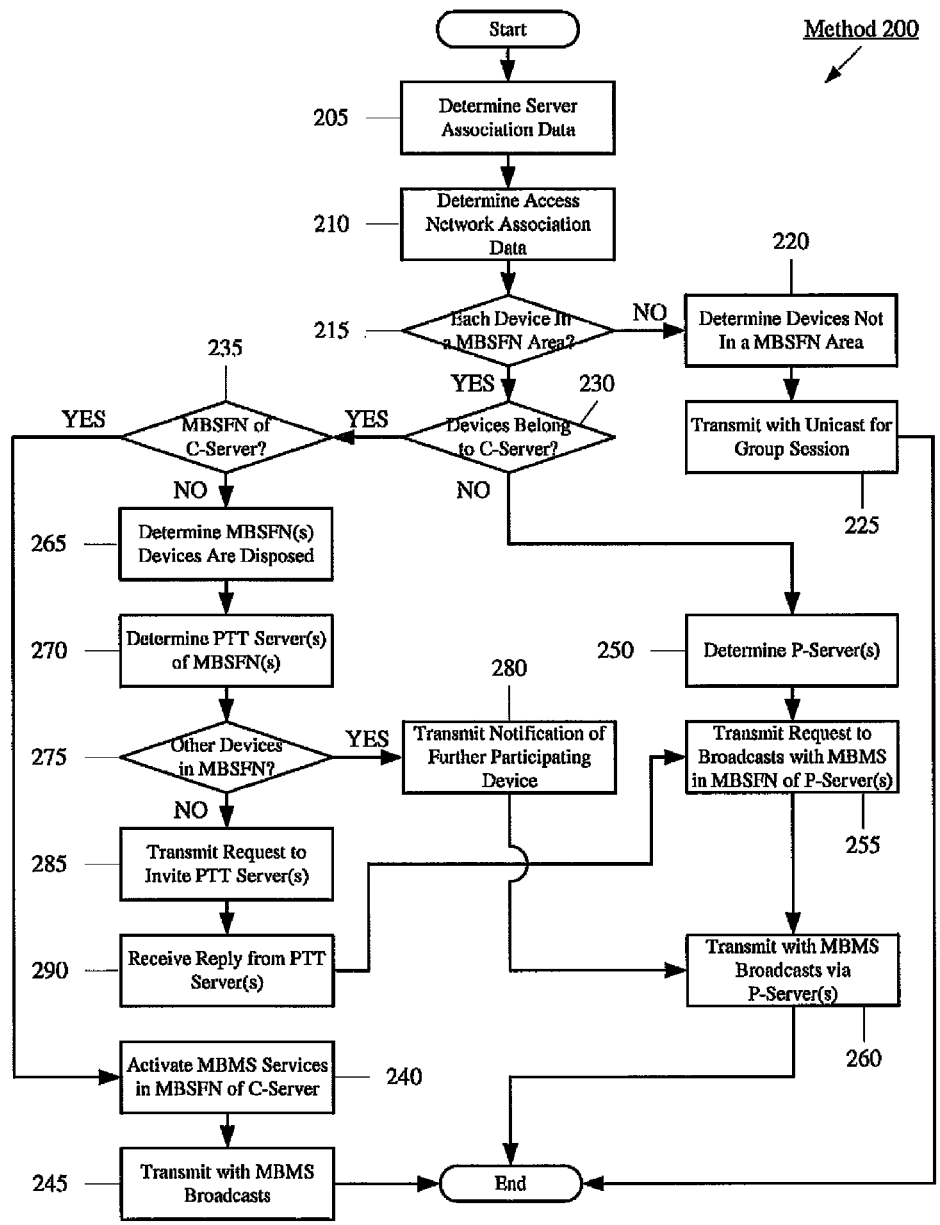
FIG. 2 illustrates a flowchart of a method for providing MBMS support in accordance with some embodiments.

FIG. 2 is a flowchart of a method 200 for providing MBMS support in accordance with some exemplary embodiments of the present invention. The method 200 relates to when the controlling PTT server 105 determines that MUs of the group session of the PTT communication group operate in a MBSFN area of an operating area that is not controlled by the controlling PTT server 105, and the PTT server serving the MBSFN area is unaware of the group session of the PTT communication group. The method 200 further relates to determining a manner of providing MBMS support to MUs of the group session of the PTT communication group. The method 200 will be described with reference to the controlling PTT server 105. Thus, the method 200 will be described with reference to the system 100 of FIG. 1.

In step 205, the controlling PTT server 105 determines server association data for the participating devices of the group session of the PTT communication group. As discussed above, the server association data may be indicative of the PTT server to which the MU belongs or is associated. In a first example, the MUs 160-195 may transmit an invite request to its home PTT server or the PTT server to which it belongs or is associated. In another example, the controlling PTT server 105 may initiate the invitation to the MUs. Accordingly, the MUs 160, 165, 180-195 each transmit an invite request (or reply) directly to the controlling PTT server 105, while the MUs 170, 175 transmit an invite request directly to the participating PTT server 120, which forwards the invite request (or reply) from these MUs to the controlling PTT server 105. As discussed above, the MUs 160-195 may join the group session of the PTT communication group in a variety of ways but with MBMS, the invite request is eventually transmitted. Subsequently, in step 210, the controlling PTT server 105 determines the access network association data of the MUs 160-195 of the group session of the PTT communication group. Specifically, the controlling PTT server 105 determines the MBSFN area of the respective MBSM operating area in which these MUs operate.

In step 215, the controlling PTT server 105 determines if each of the MUs 160-195 is operating in an MBSFN area of an operating area of a PTT server. That is, the controlling PTT server 105 determines if any of the MUs 160-195 of the PTT communication group are in a location that is incapable of receiving MBMS support for each MU in the group session. For example, an MU may operate outside each of the operating areas 108, 123, 138, and more specifically outside of an MBSFN area. It should be noted that this determination is performed for each MU of the group session of the PTT communication group. If at least one MU of the PTT communication group is not in an MBSFN area, or even an operating area where MBMS is supported, the method 200 continues to step 220. In step 220, the controlling PTT server 105 determines the identity of the MU that is not in an MBSFN area or an operating area supporting MBMS. Because the MU is not located in a location that would allow the MBMS support to be provided, in step 225, the controlling PTT server 105 determines that the MU(s) determined at step 220 is to receive control messaging only by unicast during the group session of the PTT communication group. Thus, control messaging is transmitted by unicast to this determined MU.

Returning to step 215, if the controlling PTT server 105 determines that at least one MU is operating within an MBSFN area of an operating area of a PTT server, the method 200 continues to step 230. It should be again be noted that this determination and the subsequent steps apply to each MU that is determined to be within an MBSFN area. In step 230, the controlling PTT server 105 determines if any of the MUs 160-195 of the group session of the PTT communication group belong to or are associated with the controlling PTT server 105 itself. As discussed above, the MUs 160-195 of the PTT communication group may be associated with the controlling PTT server 105 or other PTT servers such as the participating PTT server 120 or the participating PTT server 135. As illustrated in FIG. 1, the MUs 160, 165, 180-195 belong to the controlling PTT server 105, while the MUs 170, 175 belong to the participating PTT server 125. The controlling PTT server 105 may determine the association thereto using, for example, the server association data determined in step 205.

If the controlling PTT server 105 determines, at step 230, that at least one of the MUs belongs to the controlling PTT server 105, the method 200 continues to step 235. In step 235, the controlling PTT server 105 determines if the MUs belonging to the controlling PTT server 105 operate in the MBSFN area 110 of the operating area 108 of the controlling PTT server 105. As illustrated in FIG. 1, the MUs 160, 165 belong to the controlling PTT server 105 and operate in the MBSFN area 110 of the operating area 108. In step 240, the controlling PTT server 105 activates the MBMS services in the MBSFN area 110 within the MBMS operating area 108. Thus, when the MUs 160, 165 are disposed in the MBSFN area 110 of the controlling PTT server 105, the MBMS functionalities are fully supported and no further PTT server is required for the MBMS support to these devices. Accordingly, in step 245, the controlling PTT server 105 transmits multicast broadcasts to the MUs 160, 165 directly therefrom.

Returning to step 230, if at least one of the MUs of the group session of the PTT communication group that is operating within an MBSFN area of an operating area of a PTT server does not belong to or is not associated with the controlling PTT server 105, the method 200 continues to step 250. As illustrated in FIG. 1, the MUs 170, 175 do not belong to the controlling PTT server 105 but are participating devices of the group session of the PTT communication group. Thus, in step 250, the controlling PTT server 105 determines the participating PTT server that controls the MBSFN area of the operating area in which the determined MUs of step 230 are operating. As illustrated in FIG. 1, the controlling PTT server 105 determines that the participating PTT server 120 controls the MBSFN area 125 of the operating area 123 in which the MUs 170, 175 are operating. In step 255, the controlling PTT server 105 transmits a request to activate the MBMS services in the MBSFN area 125 of the operating area 123 for the participating PTT server 120. Once activated, in step 260, the controlling PTT server 105 transmits multicast broadcasts to the MUs 170, 175 via the participating PTT server 120.

Returning to step 235, if the MUs of the PTT communication group belong to the controlling PTT server 105 (as determined in step 230) but are not in the MBSFN area 110 of the operating area 108 of the controlling PTT server 105 (as determined in step 235), the method 200 continues to step 265. In step 265, the controlling PTT server 105 determines the MBSFN area of the operating area in which these MUs are operating using, for example, the access network association data as determined in step 210. As illustrated in FIG. 1, the controlling PTT server 105 determines that the MU 180 is operating in the MBSFN area 125 of the operating area 123 while the MUs 185, 190, 195 are operating in the MBSFN area 140 or the MBSFN area 150 of the operating area 138.

Specifically, the access network association data of the participating devices as used in step 210 may again be used. In step 270, the controlling PTT server 105 determines the PTT server controlling the MBSFN area in the operating area that the MUs 180-195 are operating therein. Thus, the controlling PTT server 105 determines that the participating PTT server 120 controls the MBSFN area 125 of the operating area 123 while the participating PTT server 135 controls the MBSFN areas 140, 150 of the operating area 138.

In step 275, the controlling PTT server 105 determines whether other participating devices of the group session of the PTT communication group operate in the determined MBSFN area. That is, a determination relating to whether the participating PTT server 125, 135 have participating devices belonging thereto are in the group session of the PTT communication group is performed. Specifically, the determination relates to whether the participating PTT server is aware of the group session of the PTT communication group. As discussed above, the participating PTT server 120 has transmitted invite requests received from the MUs 170, 175 that belong thereto but the participating PTT server 135 has not been involved in any way as no MUs belonging thereto are participating devices of the group session of the PTT communication group. In this scenario, the MBMS services may already be activated (or expected to be activated) in the MBSFN area 125 for the participating PTT server 120 as performed in steps 250 and 255 discussed above. If the MBMS services are already activated, the method 200 continues to step 280. In step 280, the controlling PTT server 105 transmits a notification to the participating PTT server 120 of the participating device of the PTT communication group (i.e., MU 180) residing in its MBSFN area 125. Subsequently, in step 280, the controlling PTT server 105 transmits multicast broadcasts to the MU 180 via the participating PTT server 120. It should be noted that step 280 may be combined with the request data transmitted in step 255. That is, upon the controlling PTT server 105 performing the steps 230, 235, 265, and 270, the controlling PTT server 105 may include additional data with the request data that is indicative of the further participating device. Accordingly, a further notification step may not be required (as illustrated in step 280).

Returning to step 275, if the controlling PTT server 105 determines that an MBSFN area of an operating area in which one of the participating devices operates does not have MBMS services activated (or no participating devices of the group session belong to the PTT server controlling the MBSFN), the method 200 continues to step 285. Specifically, as discussed above, as the participating server 135 is unaware of the group session of the PTT communication group, the participating server 135 has no reason to activate MBMS services in the MBSFN area 140 or the MBSFN area 150 of the operating area 138. In step 285, the controlling PTT server 105 transmits invitation data to invite the unaware, participating PTT server 135 to join the group session of the PTT communication group. In step 290, the controlling PTT server 105 may receive a reply to the request indicating that the participating PTT server 135 will join the group session of the PTT communication group. The method 200 continues to step 255 in which the controlling PTT server 105 transmits a request to activate the MBMS services in the MBSFN area 140 and/or the MBSFN area 150 so that in step 260, the controlling PTT server 105 transmits multicast broadcasts to the MUs 185-195 via the participating PTT server 135.

It should be noted that the steps of the method 200 are only exemplary and that modifications to the steps may be used. In a first example, the method 200 may include a step that determines whether a request to activate MBMS services in an MBSFN area of participating PTT servers should be performed. As discussed above, the controlling PTT server 105 and/or the participating PTT servers 120, 135 may each include a respective, predetermined threshold number for the participating devices operating in their respective MBSFN areas for the MBMS services to be activated. If the number of participating devices is below the predetermined threshold, the determination step may indicate that no request is transmitted, while if the number of participating devices is above the predetermined threshold, the request is transmitted. This determination step may be performed prior to any step that leads to step 255 in the method 200. A further determination may be made from the participating PTT server that receives the request as a function of its own predetermined threshold number of participating devices (in the case where the predetermined threshold numbers of the PTT servers are different). If the request including the number of participating devices does not satisfy the participating PTT server's predetermined threshold number, that participating PTT server may respond to the request indicating that the MBMS services will not be activated and vice versa. In a specific example, a first predetermined threshold number for the activation of MBMS services for the controlling PTT server 105 may be at least one device operating in an MBSFN area while a second predetermined threshold number for the activation of MBMS services for the participating PTT server 135 may be more than one device operating in an MBSFN area. In the case of MBSFN area 140, the controlling PTT server 105 may transmit a request to the participating PTT server 135 to activate MBMS services in the MBSFN area 140 as the number of participating devices satisfies the condition for the first predetermined threshold number. The participating PTT server 135 may also determine that the number of participating devices satisfies the second predetermined threshold number, thereby activating the MBMS services. However, in the case of MBSFN area 150, the controlling PTT server 105 may still transmit a request to the participating PTT server 135 to activate MBMS services in the MBSFN area 150 as the number of participating devices satisfies the condition for the first predetermined threshold number. The participating PTT server 135 may not determine likewise since the number of participating devices does not satisfy the second predetermined threshold number. Accordingly, the participating PTT server 135 may transmit a response to the controlling PTT server 105 indicating that the MBMS services will not be activated in the MBSFN area 150. The controlling PTT server 105 is now aware that only control messaging by unicast is transmitted directly therefrom to the MU 195 for the PTT communication group.

The above described method 200 may relate to a time period prior to and/or during the onset of the group session of the PTT communication group. However, it should also be noted that the method 200 may relate to a time period during the life of the group session of the PTT communication group as well. Specifically, as the MUs 160-195 are mobile devices, a dynamic or periodic determination of their access network association data may be used to determine whether the MBMS services should be activated in the MBSFN areas 110, 125, 140, 150. For example, if the MU 190 moved from the MBSFN area 140 to the MBSFN area 150, using the above described first and second predetermined threshold numbers, the MBSFN area 150 now satisfies the condition of the first predetermined threshold number but the MBSFN area 140 now does not satisfy the condition of the second predetermined threshold number. Accordingly, the controlling PTT server 105 may transmit a request that the MBMS services in the MBSFN area 150 be activated. As the second predetermined threshold is also satisfied, the participating PTT server 135 may activate the MBMS services so that the MUs 190, 195 receive multicast broadcasts from the controlling PTT server 105 via the participating PTT server 135. However, since the MBSFN area 140 only includes a single participating device in the group session of the PTT communication group (thereby not satisfying the condition of the second predetermined threshold number), the participating PTT server 135 may transmit a notification to the controlling PTT server 105 that the MBMS services will be deactivated. The controlling PTT server 105 will now be aware that control messaging by unicast must be transmitted directly therefrom to the MU 185 for the PTT communication group. This process may continue with each of the MBSFN area of the LTE whenever a number of participating devices changes during the course of the PTT communication group.

Figure 3:
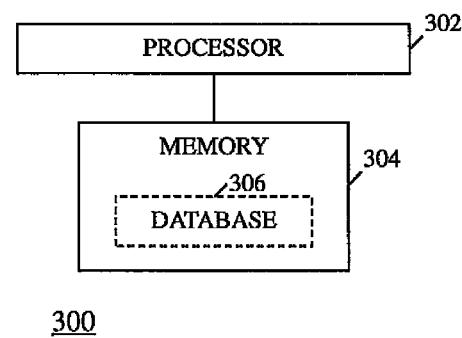
FIG. 3 illustrates a block diagram of a Push-To-Talk server in accordance with some embodiments.

Referring now to FIG. 3, a block diagram is provided that illustrates a PTT server 300, such as PTT servers 105, 120, and 135, in accordance with some embodiments. PTT server 300 includes a processor 302, such as one or more microprocessors, microcontrollers, digital signal processors (DSPs), combinations thereof or such other devices known to those having ordinary skill in the art. The particular operations/functions of the processor, and thus of the server, is determined by an execution of software instructions and routines that are stored in a respective at least one memory device (also referred to herein as a 'memory') 304 associated with the processor, such as random access memory (RAM), dynamic random access memory (DRAM), and/or read only memory (ROM) or equivalents thereof, that store data and programs that may be executed by the corresponding processor. The at least one memory device 304 further stores server association data and access network association data received from MUs and may include a database 306 that maintains a mapping of PTT servers to corresponding MSBFNs and/or MSBFN areas and corresponding operating areas. Unless otherwise specified herein, the functionality described herein as being performed by the servers 105, 120, and 135 is implemented with or in software programs and instructions stored in the respective at least one memory device of the server and executed by the associated processor of the server.

The exemplary embodiments of the present invention provide a system and method for providing MBMS support to MUs of a group session of a PTT communication group. The MBMS support may be provided to MUs operating outside the MBSFN area of a controlling PTT server. Accordingly, at least one of the MUs may be operating in an MBSFN area of a participating PTT server having at least one MU belonging thereto or at least one of the MUs may be operating in an MBSFN area of a participating PTT server having no MUs of the group session of the PTT communication group belonging thereto. Thus, the participating PTT server in the prior is aware of the group session of the PTT communication group while the participating PTT server in the latter is unaware of the group session of the PTT communication group. In the latter scenario, when at least one of the MUs belonging to the controlling PTT server but operating in an MBSFN area of an unaware participating PTT server, the controlling PTT server may transmit a request for an invitation to the group session of the PTT communication group to the unaware participating PTT server. Subsequently, a request to activate MBMS services may be performed so that multicast broadcasts during the group session of the PTT communication group may be transmitted to the MUs.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for handling a group session of a communication group, comprising:
   determining server association data for each mobile computing unit (MU) of a plurality of mobile computing units (MUs) in the communication group, wherein the server association data is indicative of a Push-To-Talk (PTT) server of a plurality of PTT servers to which the MU belongs;
   determining access network association data for each MU of the plurality of MUs, wherein the access network association data is indicative of an operating area respective to a PTT server of the plurality of PTT servers which the MU is currently operating in;
   determining, as a function of the server association data, a first MU of the plurality of MUs in the communication group that belongs to a first PTT server of the plurality of PTT servers and, as a function of the access network association data, that is currently operating in an operating area of a second PTT server of the plurality of PTT servers, wherein the first PTT server is a controlling PTT server for the group session of the communication group; and
   determining, based on the server association data, that none of the plurality of MUs participating in the group session belongs to the second PTT server and, in response, transmitting invitation data from the first PTT server to the second PTT server to invite the second PTT server to join the group session of the communication group.

2. The method of claim 1, further comprising:
   transmitting, from the first PTT server to the second PTT server, a request to activate Multimedia Broadcast Multicast Services (MBMS) services in at least one Multicast Broadcast Single Frequency Network (MBSFN) area of the operating area of the second PTT server; and
   activating the MBMS services in the at least one MBSFN area of the operating area of the second PTT server so that the first MU receives media data from the first PTT server utilizing the MBMS services of the second PTT server.

3. The method of claim 1, further comprising:
   determining, as a function of the server association data, at least one second MU of the plurality of MUs that is associated with the first PTT server and, as a function of the access network association data, that is operating in the operating area of the second PTT server; and in response to determining the at least one second MU, determining whether to transmit, from the first PTT server to the second PTT server, a request to activate Multimedia Broadcast Multicast Services (MBMS) services in at least one Multicast Broadcast Single Frequency Network (MBSFN) area of the operating area of the second PTT server.

4. The method of claim 1, further comprising:

determining as a function of the server association data and the access network association data, a number of MUs that are associated with the first PTT server and that are operate in one of the at least one MBSFN area of the operating area of the second PTT server; and transmitting an indication of the number of MUs in the MBMSFN area to the second PTT server.

5. The method of claim 4, wherein the first PTT server has a first predetermined threshold indicating whether MBMS services should be activated in the one of the at least one MBSFN area of the MBMS operating area of the second PTT server.

6. The method of claim 5, further comprising:

determining, by the first PTT server, whether the number of MUs is greater than the first predetermined threshold; and in response to determining that the number of MUs is greater than the first predetermined threshold, transmitting, by the first PTT server to the second PTT server, a request to activate the MBMS services in the one of the at least one MBSFN area of the MBMS operating area of the second PTT server.

7. The method of claim 5, wherein the second PTT server has a second predetermined threshold indicating whether MBMS services should be activated in the one of the at least one MBSFN area of the MBMS operating area of the second PTT server.

8. The method of claim 7, further comprising:

determining, by the second PTT server, whether the number of MUs is greater than the second predetermined threshold; and transmitting, by the second PTT server, an affirmative response to the request to activate the MBMS services in the one of the at least one MBSFN area of the MBMS operating area of the second PTT server when the number of MUs is greater than the second predetermined threshold.

9. The method of claim 8, further comprising transmitting, by the second PTT server, a negative response to the request to activate the MBMS services in the one of the at least one MBSFN area of the MBMS operating area of the second PTT server when a total number of MUs is less than the second predetermined threshold.

10. The method of claim 4, wherein the number of MUs is a first number of MUs and further comprising:

determining, by the first PTT server and as a function of the server association data and the access network association data, a second number of MUs that are associated with the first PTT server and that operate in the one of the at least one MBSFN area of the MBMS operating area of the second PTT server, the second number of MUs being different than the first number of MUs; and transmitting an indication of the second number of MUs to the second PTT server.

11. The method of claim 9, wherein the first PTT server has a first predetermined threshold indicating whether MBMS services should be activated in the one of the at least one MBSFN area of the MBMS operating area of the second PTT server and wherein the first PTT server transmits the request to activate the MBMS services in the one of the MBSFN area of the MBMS operating area of the second PTT server when the second number of MUs is greater than the first predetermined threshold.

12. The method of claim 9, wherein the second PTT server has a second predetermined threshold indicating whether MBMS services should be activated in the one of the at least one MBSFN area of the MBMS operating area of the second PTT server and wherein the second PTT server transmits an affirmative response to the request to activate the MBMS services in the one of the MBSFN area of the MBMS operating area of the second PTT server when the second number of MUs is greater than the second predetermined threshold and wherein the second PTT server transmits a notification indicative of the MBMS services being deactivated in the one of the MBSFN area of the MBMS operating area of the second PTT server when the second number of MUs is less than the second predetermined threshold.

13. A system, comprising:

a plurality of mobile computing units (MUs) in a group session of a communication group; and a first Push-To-Talk (PTT) server controlling the group session of the communication group, the first PTT server configured to:

determine server association data for each mobile computing unit (MU) of the plurality of MUs, wherein the server association data is indicative of a PTT server, of the first PTT server and a second PTT server, to which the MU belongs;

determine access network association data for each MU of the plurality of MUs, the access network association data being indicative of an operating area respective to a PTT server, of the first PTT server and the second PTT server, which the MU is operating in;

determine, as a function of the server association data, a first MU of the plurality of MUs that belongs to the first PTT server and, as a function of the access network association data, that operates in an operating area of the second PTT server; and determine, based on the server association data, that none of the plurality of MUs belongs to the second PTT server and, in response, transmit invitation data to the second PTT server to invite the second PTT server to join a group session of the communication group.

14. The system of claim 13, wherein the first PTT server is configured to transmit a request to the second PTT server to activate MBMS services in at least one MBSFN area of the operating area of the second PTT server so that when the MBMS services are activated in the at least one MBSFN area of the operating area of the second PTT server, the first MU receives media data from the first PTT server utilizing the MBMS services of the second PTT server.

15. The system of claim 13, wherein the first PTT server is configured to determine, as a function of the server association data, at least one second MU of the plurality of MUs that is associated with the first PTT server and, as a function of the access network association data, that operates in the operating area of the second PTT server, and in response to determining the at least one second MU, determine whether to transmit, from the first PTT server to the second PTT server, a request to activate Multimedia Broadcast Multicast Services (MBMS) services in at least one Multicast Broadcast Single Frequency Network (MBSFN) area of the operating area of the second PTT server.

16. The system of claim 13, wherein the first PTT server is configured to determine, as a function of the server association data and the access network association data, a number of MUs that are associated with the first PTT server and that operate in one of the at least one MBSFN area of the operating area of the second PTT server and to transmit an indication of the number of MUs to the second PTT server.

17. The system of claim 16, wherein the first PTT server has a first predetermined threshold indicating whether MBMS services should be activated in the one of the at least one MBSFN area of the operating area of the second PTT server, and wherein the first PTT server is configured to determine whether the number of MUs is greater than the first predetermined threshold and, in response to determining that the number of MUs is greater than the first predetermined threshold, transmit, to the second PTT server, a request to activate the MBMS services in the one of the at least one MBSFN area of the operating area of the second PTT server.

18. The system of claim 17, further comprising the second PTT server, wherein the second PTT server has a second predetermined threshold indicating whether MBMS services should be activated in the one of the at least one MBSFN area of the operating area of the second PTT server and wherein the second PTT server is configured to determine whether the number of MUs is greater than the second predetermined threshold and, when the number of MUs is greater than the second predetermined threshold, transmit an affirmative response to the request to activate the MBMS services in the one of the at least one MBSFN area of the operating area of the second PTT server.

19. The system of claim 18, wherein the second PTT server is configured to transmit a negative response to the request to activate the MBMS services in the one of the at least one MBSFN area of the operating area of the second PTT server when the number of MUs is less than the second predetermined threshold.

20. The system of claim 16, wherein the first PTT server is configured to determine, as a function of the server association data and the access network association data, a second number of MUs that are associated with the first PTT server and that operate in the one of the at least one MBSFN area of the MBMS operating area of the second PTT server, the second number of MUs being different than the first number of MUs, and to transmit an indication of the second number of MUs to the second PTT server.

21. A controlling Push-To-Talk (PTT) server homing a communication group and handling a group session of the communication group, the PTT server comprising:
- a processor configured to determine server association data for a plurality of mobile computing units (MUs) in the communication group, wherein the server association data is indicative of a PTT server, of the controlling PTT server and a participating PTT server, to which each mobile computing unit (MU) of the plurality of MUs belongs, the processor further configured to determine access network association data for the plurality of MUs, wherein the access network association data is indicative of an operating area respective to one of the PTT servers of the controlling PTT server and a participating PTT server in which each MU of the plurality of MUs operates; and
- an at least one memory device configured to store the server association data and the access network association data;
- wherein the processor is configured to determine, as a function of the server association data, a first MU of the MUs in the communication group that belongs to the controlling PTT server and, as a function of the access network association data, that operates in an operating area of the participating PTT server; and
- wherein the processor is configured to determine, based on the server association data, that none of the plurality of MUs belongs to the participating PTT server and, in response, to transmit invitation data to the participating PTT server to invite the participating PTT server to join the group session of the communication group.

* * * * *